Feb. 23, 1965 H. SCHMID 3,171,022

HYBRID MULTIPLIER

Filed Feb. 17, 1961 3 Sheets-Sheet 1

HERMANN SCHMID
INVENTOR

BY Richard D. Stephens
ATTORNEY

HERMANN SCHMID
INVENTOR

BY Richard G. Stephens
ATTORNEY 3,171,022
Patented Feb. 23, 1965

3,171,022
HYBRID MULTIPLIER

Hermann Schmid, R.D. 5, Binghamton, N.Y.

Filed Feb. 17, 1961, Ser. No. 90,038
7 Claims. (Cl. 235—150)

This invention relates to electronic computer circuits, and more specifically, to an improved combined analog-digital or hybrid multiplier circuit. Because high-accuracy real-time computation is too slow using economically available digital computers, and because analog computing techniques are not sufficiently accurate, digital differential analyzers and variable increment computers have been developed, and although such systems evidence considerable improvement over prior art systems they still are either too slow, or else too complex and expensive. To overcome the defects of these machines, more attention presently is being applied to the development of "hybrid" analog-digital computation systems. In a hybrid system a variable is represented by a digital signal for the most significant part and by an analog voltage for the least significant part. Each computing element in a hybrid system accepts both a digtal and an analog signal (or *several* of each) and provides a digital output and an analog output.

In the present invention the digital input signal advantageously consists of a binary number rather than a pulse rate, which heretofore has been used in some devices, and therefore the present invention is simpler and more economical, and also capable of operating with higher input frequencies. The present invention also employs a parallel binary multiplier enabling it to multiply two digital signals simultaneously, which is another important advantage over prior art systems.

Thus it is a principal object of the present invention to provide an improved hybrid (analog-digital) multiplier apparatus which is simple and economical and capable of multiplying two hybrid input signals with great speed and accuracy to provide a product output signal also in hybrid form.

Figure 1:
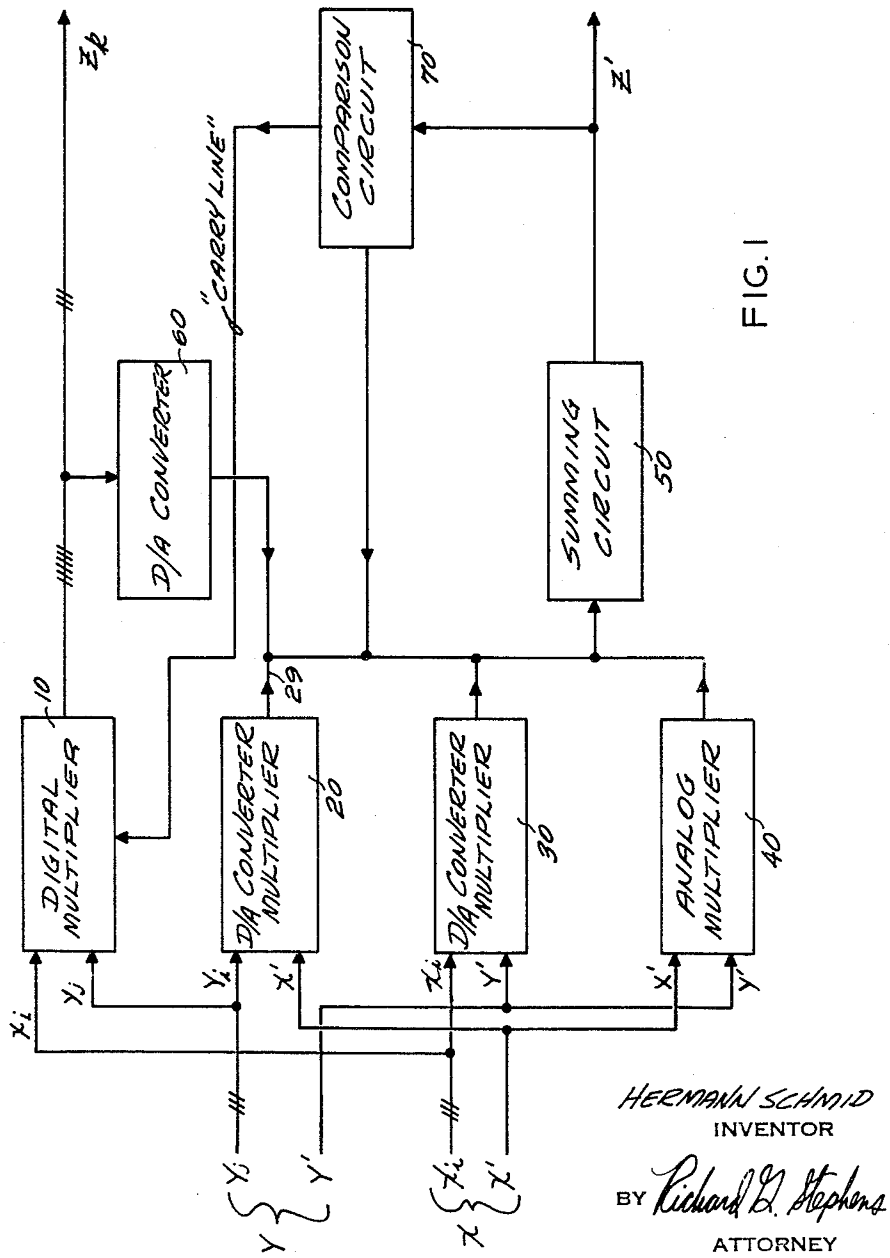
FIG. 1 is a block diagram of an exemplary embodiment of the invention useful in understanding the overall arrangement of the invention.
Figure 5:
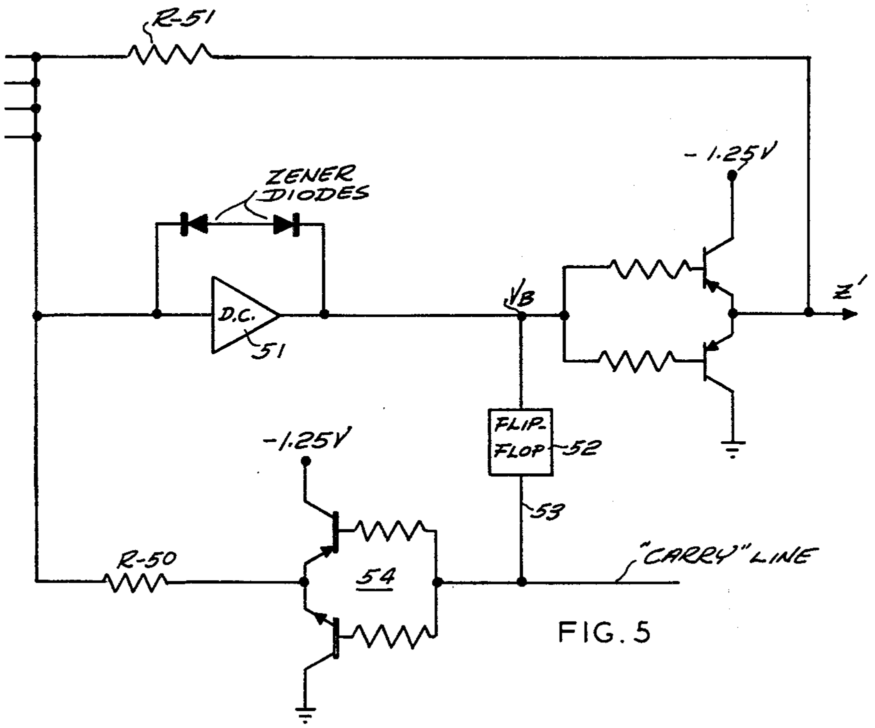
Figure 4:
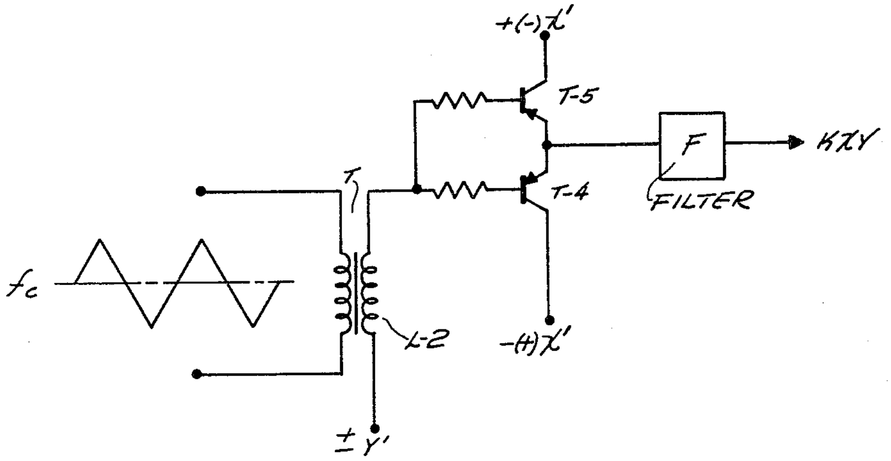

FIG. 4 is an electrical schematic diagram of a known analog multiplier circuit which may be used as multiplier 40 of FIG. 1; and FIG. 5 is an electrical schematic diagram of the summing and comparison apparatus signified by blocks 50 and 70 in FIG. 1

Referring now to FIG. 1, it will be seen that the two variables X and Y fed as inputs to the invention each are represented in hybrid form. In FIG. 1 the variable X is deemed to be represented by $X_i+X'$, where $X_i$ is a parallel binary input number representing a most significant part of X, and X' is an analog input voltage representing a least significant part of X. Similarly, the variable Y is represented by $Y_j+Y_j$, where $Y_j$ is a parallel binary number and Y' is an analog input signal. The three slash lines on the $Y_j$ and $X_i$ lines in FIG. 1 signify that each quantity is carried on three conductors.

Since $$X=X_i+X' \text{ and } Y=Y_j+Y'$$

the product $$XY=(X_i+X')(Y_j+Y')$$
$$=X_iY_j+X_iY'+X'Y_j+X'Y'$$

i.e., the sum of four products. While it would appear at first that instrumentation of the expanded equation would be wasteful and difficult, closer analysis will reveal that the requirements and tolerances placed on the individual elements are much less severe.

In FIG. 1 the upper block 10 consists of a parallel binary multiplier which accepts two binary digital signals ($X_i$ and $Y_j$) and provides a product binary output signal ($X_i$ times $Y_j$). Blocks 20 and 30 each accept one digital input signal and one analog input signal, and extremely simple circuitry may be used to multiply such signals to provide analog output signals. Block 40 may comprise any ordinary analog multiplier. The output signal from the digital multiplier 10 is digital in form, but the other three outputs are analog, and as shown in FIG. 1, they are added by a conventional analog summing device 50. Thus it will be seen that the apparatus of FIG. 1 is capable of multiplying two variables in hybrid form to provide a hybrid output $Z_k+Z'$, where $Z_k$ is the output of digital multiplier 10 and Z' is the output of analog summing device 50.

Because of the particular circuitry chosen, the number of digits of the multiplier 10 output equals the sum of the digits of the two input signals $X_i$ and $Y_j$, although it usually is desirable in a hybrid system to carry the same number of digits throughout the system. For this reason, some of the less significant digits of the digital output signal ($X_iY_j$) are converted back into an analog signal, by means of digital-to-analog converter 60 in FIG. 1, and the analog signal is combined in summing circuit 50 with the previously-mentioned analog signals.

The major advantages of the invention became apparent upon consideration of the amount of accuracy required from the various elements. For sake of example, assume that the system is to be used in connection with variables that range between +10 and −10. For sake of simplicity, assume further that digital multiplier 10 accepts one *decimal* digit on each input ($X_i$ and $Y_j$) and provides two *decimal* digits at its output, that the least significant part of each variable is represented by a D.C. voltage varying between zero and −1.00 volt, and that one wishes to multiply 9.2 times 8.6. The inputs to digital multiplier 10 should be "9" and "8," and the output from multiplier 10 should be "72." The inputs to multiplier 20 should be "9" and ".6," and the output should be "5.4." The inputs to multiplier 30 should be "8" and ".2," and the output should be "1.6." The inputs to analog multiplier 40 should be ".2" and ".6," and the output should be "0.12." When summed, the four output values provide the correct product "79.12." The magnitudes of the output signals of each of the multipliers in the example discussed above is inversely proportional to the accuracy required from the various multiplier elements. For example, if it is desired that the overall multiplier accuracy be within .01%, the digital multiplier 10 accuracy must be that accurate, multipliers 20 and 30 must have .1% accuracy and analog multiplier 40 must have only 1% accuracy. In order to represent the output signal with the same number of digits as the input signals, it is necessary to move the decimal point one place to the left and convert everything on the right of the decimal point into an analog signal, and to note the change in scale. While it is convenient to use decimal arithmetic in the above example to illustrate the principle, binary arithmetic is deemed preferable in the actual apparatus.

Assuming again the multiplication of 9.2 times 8.6, assume now that the input signals are represented by a three digit *binary* number and a direct voltage varying between zero and 1.25 volts. The maximum range of variation of the analog voltage determines the amount which a binary unit will represent, and hence a binary "one" will represent 1.25 volts, a binary "two" will represent 2.50 volts, etc., in the multiplier input signals. It should be noted that teh criterion which determines how X is converted into $X_i$ and X′ is arbitrary. In the scaling of any computer, an input variable may be represented by any desired units, so long as the scale factors are noted throughout the device, and in the case of a hybrid computer, so long as the analog portion of a hybrid signal continue to be related to the digital portion by a known relationship. In the example now being explained, therefore, each of the input signals are represented by a three digit *binary* number and a direct voltage varying between zero and 1.25 volts, it being understood that other and different criteria may be selected as desired.

$X=9.2=8.75+0.45=0111+0.45$ volt
$Y=8.6=7.5+1.1=0110+1.1$ volts
$XY=(0111+0.45_v)(0110+1.1_v)=101010+(8.75\times 1.1_v)+(7.5\times 0.45_v)+(1.1_v\times 0.45_v)$
$XY=101010+13.495$
$XY=65.625+13.495=79.12$ For proper scaling, it will be seen that the six digit binary number 101010 ought to be reduced to 101000, and the least significant part 010 be converted to analog form. Because the two binary numbers in the input isgnals have scale factors of 1.25 and the numbers are multiplied, the binary numbers in the output product have a scale factor of $1.25^2$. The binary number 010 equals 3.125 volts (i.e., $2\times 1.25^2$) in the above example. Thus XY can be represented as 101000+16.620 volts. If the binal point is shifted three places to the left if the analog voltage is reduced by a factor of 10, the product output will be represented by 101+1.662 volts, which by definition equals 6.250+1.662=7.912, the desired total scaled down by a factor of 10. The proper code for 7.912 would be 110+0.412 volt rather than 101+1.662 volts, because by definition the analog voltage varies only between zero and 1.25 volts. Thus one unit, 1.25 volts, should be subtracted from the analog portion and carried to the digital number. Whenever the summed analog voltage exceeds 1.25 volts, a "carry" must be added to the binary number representing the most significant part of the output variable and 1.25 volts simultaneously must be subtracted from the summed analog voltage representing the least significant part of the variable. Comparison circuit 70 in FIG. 1 performs these functions, so that a carry signal derived by comparison circuit 70 is routed to the appropriate adder circuit in digital multiplier 10, and a 1.25 volt analog voltage is applied from circuit 70 to be subtracted from the four voltages applied to be added by summing means 50.

Figure 2:
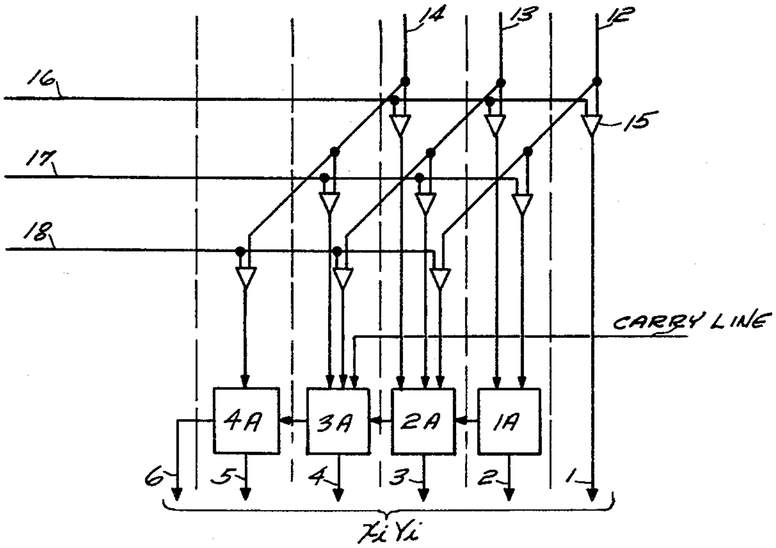
FIG. 2 is an electrical schematic diagram, partially in block form, of an exemplary parallel binary digital multiplier which may be used as multiplier 10 of FIG. 1.

The full advantages of the present invention become evident only after the extreme circuit simplicity is noted; and exemplary circuitry for the above described elements of FIG. 1 now will be described. Digital multiplier 10 may comprise any suitable circuit that will produce a product in digital form from two digital input signals. An exemplary and economical suitable digital multiplier is shown in FIG. 2, as having three digit inputs. The multiplicand input at the top of FIG. 2 comprises a three-digit input on lines 12, 13 and 14. Each multiplicand input line feeds one input of an "AND" coincidence gate, such as 15 of a matrix of AND gates. An individual coincidence gate for each multiplicand digit line is required for each digit in the multiplier, so that a three-digit multiplicand and a three-digit multiplier require nine AND gates. The multiplier input from the left side of FIG. 2 comprises a three-digit input on lines 16, 17 and 18. Each "one" in the multiplicand digits group paired with a "one" in the multiplier digits group provides an output from the gate associated with the pair of digits. The gate outputs are grouped into columnar groups and applied to operate conventional binary adders, which are shown grouped into four blocks 1A, 2A, 3A, 4A in FIG. 2. The carry line is shown connected to adder 3A, the fourth order output digit of the digital multiplier. This digit will be the lowest order product output digit of the invention, since the three lowest order digits are converted to analog form by converter 60. The digital adders shown may take a variety of forms, such as simple diode adders. Reference may be had to "Digital Computer Components and Circuits" by R. K. Richards for example. In general, if $n$ is the number of binary digits to be handled, the circuit of FIG. 2 requires $n^2$ gates (having perhaps 2 diodes each) and $n^2-2$ half adders. The half adders may be simple diode types, or in some embodiments Kirchoff adders, using resistances in well-known fashion.

Figure 3:
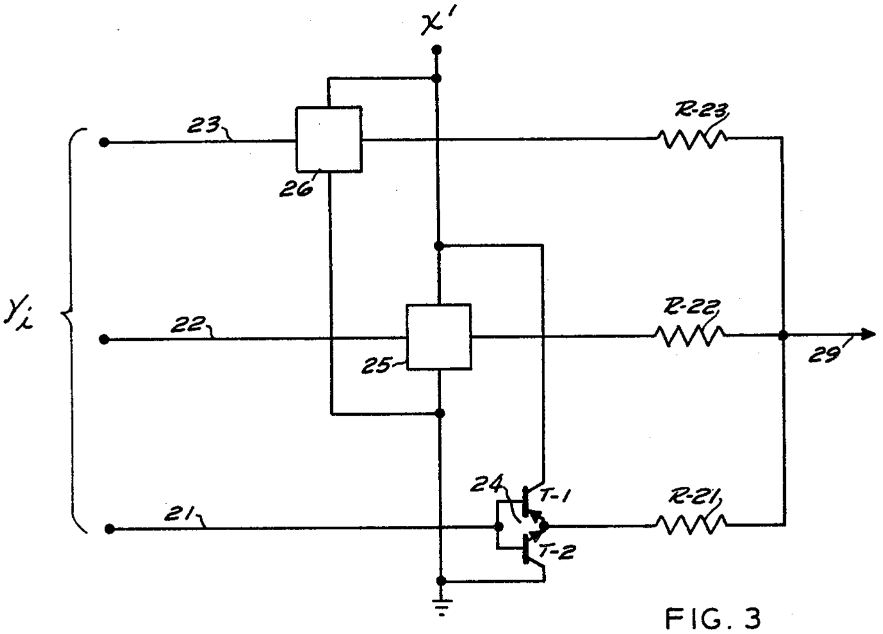
FIG. 3 is an electrical schematic diagram, partially in block form, of an exemplary converter-multiplier circuit which may be used in constructing circuit elements 20, 30 and 60 of FIG. 1.

The converter-multipliers 20 and 30 each, for a three-digit binary input, require only three complementary transistor voltage switches (six transistors) and three binary-weighted precision resistors. Multiplier 20 shown in FIG. 3 receives its three-digit $Y_j$ input on lines 21, 22 and 23 which feed three identical complementary switches 24, 25 and 26, respectively. Switch 24 is shown as comprising two transistors T–1 and T–2 of opposite conductivity types, whose emitters are interconnected to provide an output which is applied through scaling resistor R–21 to output line 29. The analog input variable X′ is connected as shown to the collector of transistor T–1 and similarly to the other voltage switches. When the switches are energized by the lines of the $Y_j$ input variable applied to the bases of the transistors, the current flowing to the summing point 29 is proportional to the product of the analog input variable X′ and the digital input variable $Y_j$. Converter-multipliers 30 and 60 may be identical of course, to circuit 20. While an exemplary converter-multiplier circuit is illustrated in FIG. 3, it should be understood that other known digital-to-analog converters having a multiplication capability may be substituted without departing from the invention.

The analog multiplier 40 may be made very simple. The accuracy required from it need be only 1% of full scale in a system having ±.01% accuracy, as mentioned above, and because variables are specified in the hybrid system always as a digital number *plus* an analog quantity the analog variables always may be of the same polarity even when negative variables are handled, so analog multiplier 40 need operate only over one quadrant. Thus any analog multiplier capable of the desired accuracy and operable over (at least) one quadrant may be used. A suitable multiplier having more than adequate capabilities is the device shown in FIG. 4, which consists of a pair of PNP and NPN transistors T–4 and T–5 connected in cascade. Transistor T–4 and T–4 are driven by a sawtooth wave from a triangular or sawtooth wave generator connected to the primary winding of transformer T. The transistors limit the output to the positive and negative supply potentials (+X or −X) with very high accuracy, plus or minus X being one variable and Y the other machine variable. Y is fed into the circuit to shift the D.C. or average level of the triangular wave by biasing secondary L–2 of transformer T. The output is a clipped waveform of pulses having areas which are directly proportional to XY, so that application of the clipped waveform to filter means F provides an analog XY output potential. Numerous other analog multipliers also may be substituted without departing from the invention.

While the summing and comparison circuits have been shown in FIG. 1 as separate blocks 50 and 70 for convenience of explanation, in actual construction of the invention they may take the form illustrated in FIG. 5, which, in reality, is a simplified form of the partial analog-to-digital converter disclosed in my copending application Serial No. 62,663, filed October 14, 1960, with provision for a single binary digit. The circuit advantageously uses an accurate bi-directional electronic limiter circuit shown in my copending application Serial No. 755,292, filed August 15, 1958, now abandoned, to which reference may be had for a detailed explanation. Whenever the sum of the four inputs to D.C. amplifier 51 from elements 20, 30, 40 and 60 varies between ground and minus 1.25 volts, the Z′ input voltage faithfully follows the summed input, but with inverted sign. Conventional flip-flop 52 is arranged to be "set" when $V_B$, the output voltage of D.C. amplifier 51 goes more negative than 1.25 volts, providing an output on its lines 53, and to "reset," removing the output from line 53 whenever the $V_B$ voltage goes more positive than ground. When flip-flop 52 sets, it operates complementary transistor switch 54, which applies a precision −1.25 volt signal to amplifier 51 via scaling resistor R–50. The output signal on line 53 is used to provide the carry signal to the adders in digital multiplier 10, and simultaneously to operate switch 54 to subtract 1.25 from the amplifier input, thereby performing the necessary carry functions described above.

If most significant digit in each digital signal is utilized to indicate sign, or sense, rather than magnitude the multiplier will operate properly through all four quadrants, since the binary multiplication table corresponds to the rules governing multiplication of numbers of changing polarity or sign. As mentioned above, because of the definition of the analog portion of hybrid variables, multipliers 20, 30 and 40 need handle signals of only a single polarity.

The static accuracy of the invention is limited only by the complexity or cost allowed, of particularly digital multiplier 10. Like most digital circuits this multiplier may be made as accurate as desired by providing circuitry for more digits to represent to most significant part of the variable. In contrast to the usual digital computer the resolution of the multiplier of the present invention is theoretically infinite, due to representation of the least significant portion of the variables in analog form. The dynamic range of the multiplier is determined by circuit noise, which stems mainly from drift in D.C. amplifier 51 and the voltage drops across the transistor switches. In a typical embodiment the noise should be below 1 millivolt in a 100 volt full scale system, to provide a dynamic range of at least 100,000. The frequency responses of the individual multiplier elements may be made high, so that signal frequencies above 1000 cycles per second may be handled adequately.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An electronic multiplier circuit for multiplying first and second input signals together representing a multiplicand variable by third and fourth input signals together representing a multiplier variable to provide fifth and sixth output signals together representing the product of said variables, wherein said first, third and fifth signals are digital parallel binary signals and said second, fourth and sixth signals are analog, said circuit comprising in combination: a parallel binary multiplier circuit connected to receive said first and third signals and operative to provide said fifth signal; a first digital-to-analog converter multiplier circuit connected to receive said second and third signals and operable to provide a first analog voltage commensurate with the product of said second and third signals; a second digital-to-analog converter multiplier circuit connected to receive said first and fourth signals and operable to provide a second analog voltage commensurate with the product of said first and fourth signals; an analog voltage multiplier circuit connected to receive said second and fourth signals and operable to provide a third analog voltage commensurate with the product of said second and fourth signals; and summing means for combining said first, second and third analog voltages to provide said sixth signal.

2. Apparatus according to claim 1 having a digital-to-analog converter circuit connected to convert a least significant portion of said fifth signal to a fourth analog voltage, and circuit means connecting said fourth analog voltage to be combined with said first, second and third analog voltages.

3. Apparatus according to claim 1 having carry-generating means responsive to said sixth signal for sensing excursion of said sixth signal outside predetermined limits and for generating carry signals to modify operation of said digital multiplier circuit and to control application of a fixed reference voltage to said summing means.

4. Apparatus according to claim 1 in which at least one of said digital-to-analog converter multiplier circuits comprises a plurality of complementary transistor switches equal in number to the number of digits of the applied digital signal, each of said complementary transistor switches comprising a pair of mutually opposite conductivity type transistors having interconnected emitter terminals, the applied analog voltage being applied between the collector electrodes of said switches, and the lines of the digital input signal being connected to control the potentials of the base electrodes of said transistors.

5. A hybrid multiplier comprising, first and second hybrid input signals, each of said input signals including a parallel binary portion and an analog portion; a parallel binary multiplier circuit coupled to the parallel binary portions of said first and second input signals operative to provide a parallel binary output signal commensurate with the product of said first and second parallel binary portions; a first digital-to-analog converter multiplier coupled to the parallel binary portion of said first input signal and the analog portion of said second input signal operative to provide a first analog signal commensurate with the product thereof; a second digital-to-analog converter multiplier coupled to the parallel binary portion of said second input signal and the analog portion of said first input signal operative to provide a second analog signal commensurate with the product thereof; an analog multiplier circuit coupled to the analog portions of said first and second input signals operative to provide a third analog signal commensurate with the product of said first and second analog portions; and summing means coupled to said first, second, and third analog signals operative to provide an analog output signal, said parallel binary output signal and said analog output signal in combination forming a hybrid output signal whose magnitude is representative of the product of said first and second hybrid input signals.

6. The hybrid multiplier of claim 5 further including a digital-to-analog converter coupled to said parallel binary output signal to reduce the number of binary bits therein to the number of binary bits in the parallel binary portions of said first and second input signals by providing a fourth analog signal commensurate with the value of the excess bits of lesser significance; and circuit means coupling said fourth analog signal to the input of said summing means.

7. The hybrid multiplier of claim 5 wherein said parallel binary multiplier circuit is effective to multiply the parallel binary portions of said first and second input signals simultaneously.

References Cited in the file of this patent

H. K. Skramstad: "A Combined Analog-Digital Differential Analyzer," Proceedings of the Eastern Joint Computer Conference, No. 16 (Dec. 1–3, 1959), pp. 94–100.